United States Patent [19]

Cronch et al.

[11] Patent Number: 5,237,463
[45] Date of Patent: Aug. 17, 1993

[54] DIFFERENTIAL SLIMMER

[75] Inventors: Robert D. Cronch; Dennis D. Duffy, both of Oklahoma City, Okla.

[73] Assignee: Seagate Technology, Inc., Scotts Valley, Calif.

[21] Appl. No.: 907,763

[22] Filed: Jun. 30, 1992

Related U.S. Application Data

[63] Continuation of Ser. No. 516,307, Apr. 30, 1990.

[51] Int. Cl.$^5$ .............................................. G11B 5/09
[52] U.S. Cl. ...................................................... 360/46
[58] Field of Search ........................................... 360/46

[56] References Cited
U.S. PATENT DOCUMENTS

3,864,734  2/1975  Gish ...................................... 360/46

Primary Examiner—Vincent P. Canney
Attorney, Agent, or Firm—Flehr, Hohbach, Test, Albritton & Herbert

[57] ABSTRACT

A circuit for slimming signals read signals from a read/write head of a rotating disk data storage device. A low-pass filter and a high-pass filter are connected in parallel to the read signal from the read/write head. These filters each have a variable gain amplifier connected to their respective output ports. The gain of each of the variable gain amplifiers is programmably adjusted in accordance with preselected criteria. A summing circuit is connected to the outputs of the variable gain amplifiers to generate a slimmed read signal. A multi-pole low pass filter has an input port coupled to the output port of the summing circuit.

4 Claims, 8 Drawing Sheets

DIFFERENTIAL SLIMMER

This is a continuation of application Ser. No. 07/516,307 filed Apr. 30, 1990.

BACKGROUND OF THE INVENTION

1. Field of the Invention

This invention relates to circuits for signal processing signals from read/write heads in magnetic disk storage systems and, more particularly, to read pulse slimming circuits.

2. Prior Art

Previously, pulse slimming, or sharpening, of read signals from a read/write head of a magnetic disk recording system was accomplished using delay lines to provide a raised cosine response for the read signals from the read/write head. It is desirable that the delay lines be eliminated and pulse slimming be accomplished using circuits which are produced, using more cost effective integrated circuits technology. To reduce noise and interference pickup, it is desirable to use balanced, differential circuit configurations for pulse slimming circuits.

SUMMARY OF THE INVENTION

It is an object of the invention to provide an adjustable pulse-slimming circuit for processing read signals from the read/write head of a magnetic disk recording system.

It is another object of the invention to provide a differential, balanced pulse slimming circuit for processing a read signal in a magnetic disk recording system to reduce noise and interference pickup.

It is another object of the invention to provide a programmably adjustable pulse-slimming circuit which is adjusted to accommodate the read-pulse characteristics of various zones on a magnetic disk and to optimize pulse-slimming for read signals from the various zones.

In accordance with these and other objects of the invention, a circuit for slimming read signals received from a read/write head of a rotating disk data storage device is provided. A first low-pass filter is connected to receive the read signal from the read/write head. A high-pass filter is connected to the read/write head for receiving the read signal. A first variable gain amplifier is connected to the output of the low pass filter; and a second variable gain amplifier is connected to the output of the high pass filter. Means are provided for selectively adjusting the gain of each of the variable gain amplifiers in accordance with preselected criteria. A summing circuit is connected to the output ports of the variable gain amplifiers to generate a slimmed signal from the amplified components of the read signal received from the read/write head.

The pulse-slimming circuit further includes a second low-pass filter, which is a multi-pole filter. This filter has an input port coupled to the output port of the summing circuit to receive the slimmed signal from the output port of the summing circuit.

The pulse-slimming circuit further includes a differentiator circuit having an input port coupled to the output port of the multi-pole low pass filter. The differentiator circuit has an output port at which is provided a differentiated output signal for the multi-pole low pass filter.

A method is provided for slimming signals received from a read/write head of a rotating disk data storage device. The method includes the steps of filtering the signal into high and low frequency components; amplifying each component by an amount selected in accordance with a preselected criterion; and adding the amplifier components.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

One of the primary goals of the present invention is to facilitate production of a sharp positive-going edge each time that a reversal in magnetic flux occurs on a magnetic data storage disk as the disk is rotated past a read/write head. The pulse edge is to be centered on the peak of the corresponding emf pulse generated in the read/write head by the passage of the head over the magnetic recording media.

Figure 1:
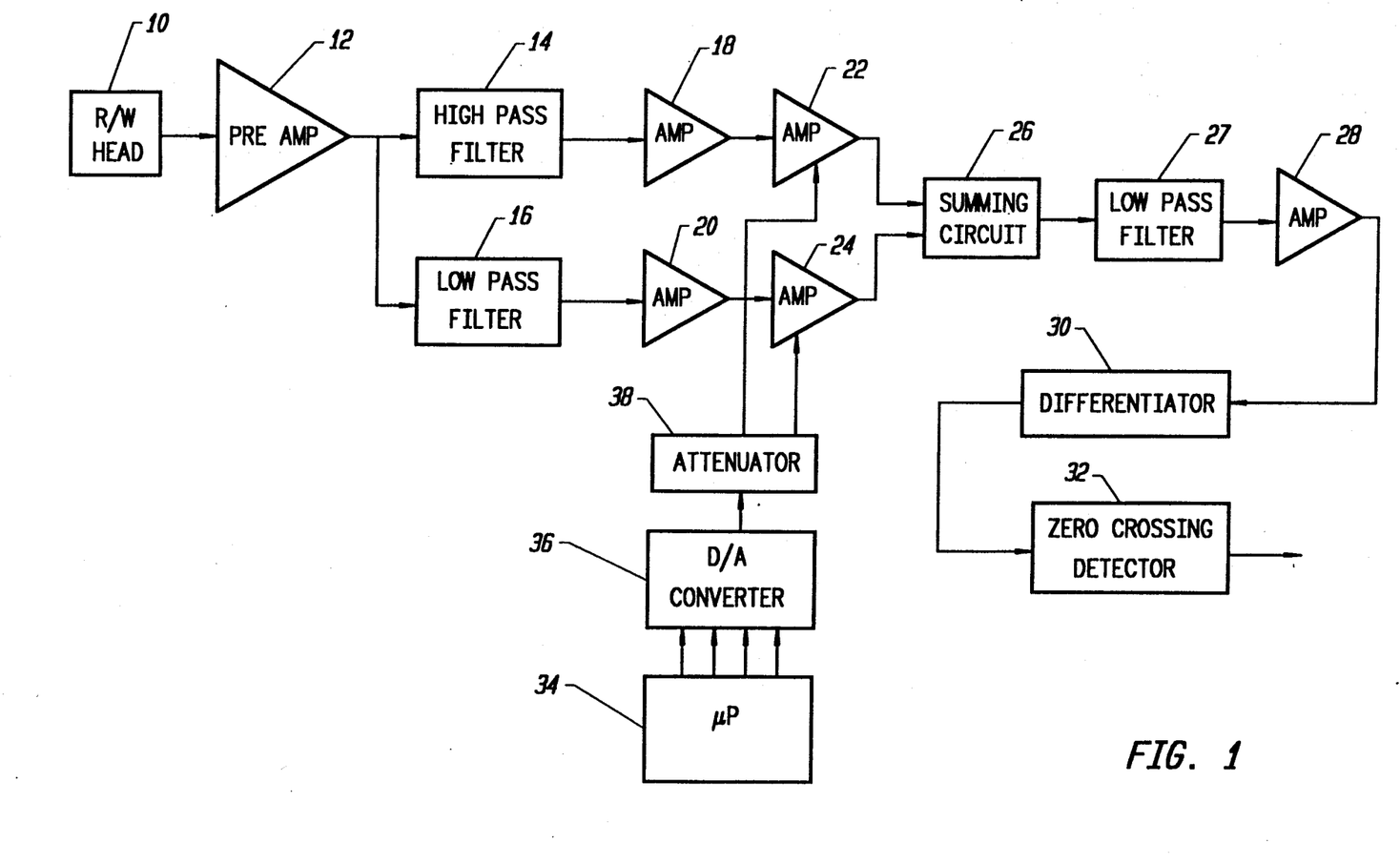
FIG. 1 is block diagram of a single-ended, unbalanced embodiment of a slimming circuit for slimming signals obtained from a read/write head of a magnetic disk storage device.

FIG. 1 shows a circuit, according to the invention, for accomplishing this. The read/write head 10 generates a read pulse signal. The read pulse signal is first amplified in a preamplifier 12 and then passed in parallel through both a high-pass filter 14 and a low-pass filter 16. After additional amplification in first-stage amplifiers, the respective filtered signals are each separately amplified by adjustable gain amplifiers 22 and 24. The output signals of these amplifiers 22,24 are then summed in a summing circuit, or mixer, 26. The pulse at the output terminal, or port, of the summing circuit 26 has a frequency spectrum which has been modified from that of the original read signal from the read/write head. The output pulse of the summing circuit 26 is passed through a second low-pass filter 27, which has a frequency range that overlaps the frequency range of the high-pass filter 14. The pulse is additionally amplified by amplifier 28 and then differentiated by a differentiator circuit 30. The output signal of the differentiator is then passed through a zero-crossing detector 32 to provide the desired positive-going edge, corresponding to a magnetic flux reversal on the storage disk.

Note that the original read pulse signal is shaped by separating it into a high-frequency portion and a low-frequency portion. Each of these portions is separately amplified in the variable gain amplifiers and then combined in the summer circuit to regenerate a modified, slimmed pulse. Selection of the amount of amplification for each of the variable-gain amplifiers is accomplished by providing control signals to control terminals for the variable-gain amplifiers.

The control signals are provided, for example, as one of 16 levels from binary-coded information provided by a microprocessor 34 and converted in a digital-to-analog converter 36. An attenuator 38 provides suitable control signal levels for the variable-gain amplifiers 22,24.

Selection of appropriate control signal levels is accomplished as follows:

First, it is recognized that the shape of any pulse generated in the read/write R/W head depends upon the distance between the R/W head and the radial position of the head with respect to the center of the rotating disk. The relative linear speed of the disk with respect to the R/W head effects the read signal in two ways. One way is that the R/W head flies over the surface of the disk on a film of air which turns with the disk. Variations in the linear speed of the disk results in variations in the force provided by the moving air to maintain the R/W head above the disk. As a result, the height of the head above the disk surface varies with the radial position of the R/W head. Consequently, variations in the magnetic flux intercepted by the head at different radial positions are produced, to effect the shape of the read pulses.

Secondly, since the emf induced in the head is related to the time rate of change of magnetic flux, variations in the speed of the disk with respect to the head also effects the shape of the read pulse.

Consequently, the pulse shaping that needs to be done is related to the radial position of the R/W head.

Pulse shaping is accomplished by dividing the magnetic disk into zones. For each zone, read pulses are generated by the R/W head and fed through the slimmer circuit. The waveforms of the output pulses of the slimmer circuit are observed for various combinations of levels of amplification through the amplifiers 22,24, as controlled by the D?A converter 36 and the attenuator 38. The signal levels which provide the best output pulse shape are determined for the reconstructed read signals at the output of the summer circuit 26. The microprocessor 34 is then programmed to provide the corresponding appropriate level of amplification for the amplifiers 22,24 whenever magnetic data on a particular track within a given zone is to be read.

Figure 2:
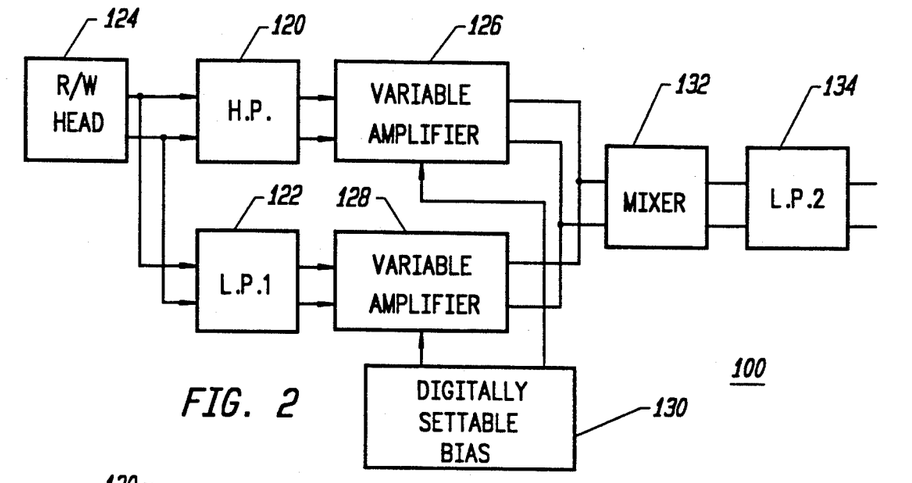
FIG. 2 is a block diagram of a differential-circuit, balanced embodiment of a slimming circuit for slimming signals obtained from a read/write head of a magnetic disk storage device, wherein the slimming circuit utilizes balanced, differential circuits.

FIG. 2 shows a slimming circuit 100 which operates in a differential, balanced mode to minimize noise pickup. The circuit includes parallelled high and low pass filters 120,122 that receive pulses from the read/write head 124 of the disk storage device and, after filtering, pass the pulses to variable-gain, differential filters 126 and 128. The gains of each of the filters 126 and 128 is controlled on a zone basis by a four-bit digital number supplied to a digitally settable bias circuit 130 from a system microprocessor (similar to the microprocessor 34 of FIG. 1). These digital numbers are found experimentally by observing single read pulses that have passed through the entire circuit for each of the sixteen possible values and choosing the value which gives an optimally shaped pulse. The digital numbers are then stored in the microprocessor system on a zone-by-zone basis and the amplifier gains adjusted accordingly whenever a track in a particular zone is read. The outputs of the amplifiers are combined in a mixer 132 and the combined output of the mixer is passed through a 7-pole, low pass filter 134, which provides a sharp high frequency cutoff.

Figure 3:
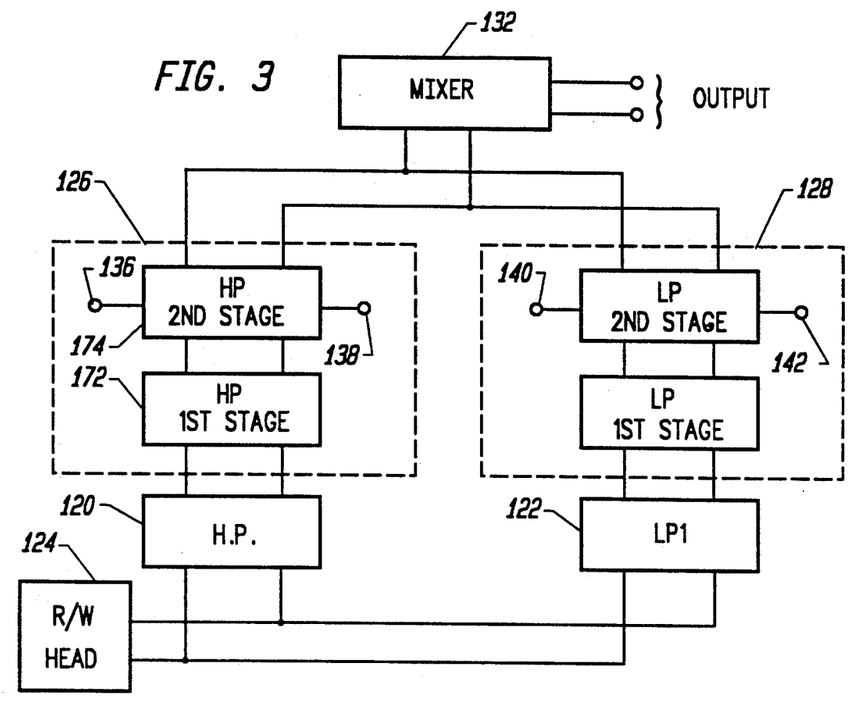
FIG. 3 is a block diagram showing the layout of the differential-circuit embodiment of FIG. 2.

FIG. 3 shows the general layout, for example of a printed circuit board, of the amplifying stages and their connection and relationship to various other circuit elements, including the read/write R/W head 124. As shown therein, the amplifier 126 has gain-control input terminal 136,138. The amplifier 126 also has a fixed gain first stage 172 that receives the output of the high-pass HP filter 120. A variable-gain second stage 174, which has the gain-control terminals 136,138, receives the output signals from the first stage 172 and drives the mixer 132. The amplifier 128 for the low-pass filter LP1 122 has gain control terminals 140,142 and is substantially identical to the amplifier 120. As indicated by the pairs of signal lines between the various elements illustrated, the first and second stages of both amplifiers are differential amplifiers, as shown in more detail in FIGS. 4 and 5 below.

Figure 4:
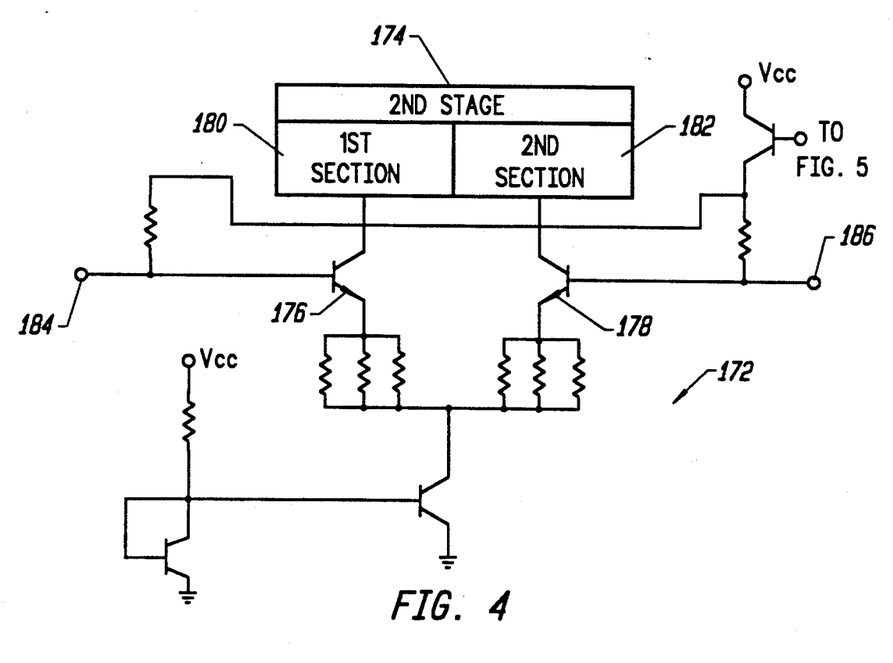
FIG. 4 is a circuit diagram of the first stage of a differential-circuit variable amplifier following a low-pass or a high-pass filter network of FIG. 2.

FIG. 4 is a circuit diagram of the first stage 172 of the amplifier 126. The first stage 172 is a differential amplifier having a differential pair of transistors 176 and 178 operating in a common emitter configuration. Note that the first section 180 and the second section 182 of the second stage 174 each provide a respective load for corresponding sections 176,178 of the first stage 172. The signal from the high-pass filter 120 is received on input terminals 184,186.

Figure 5:
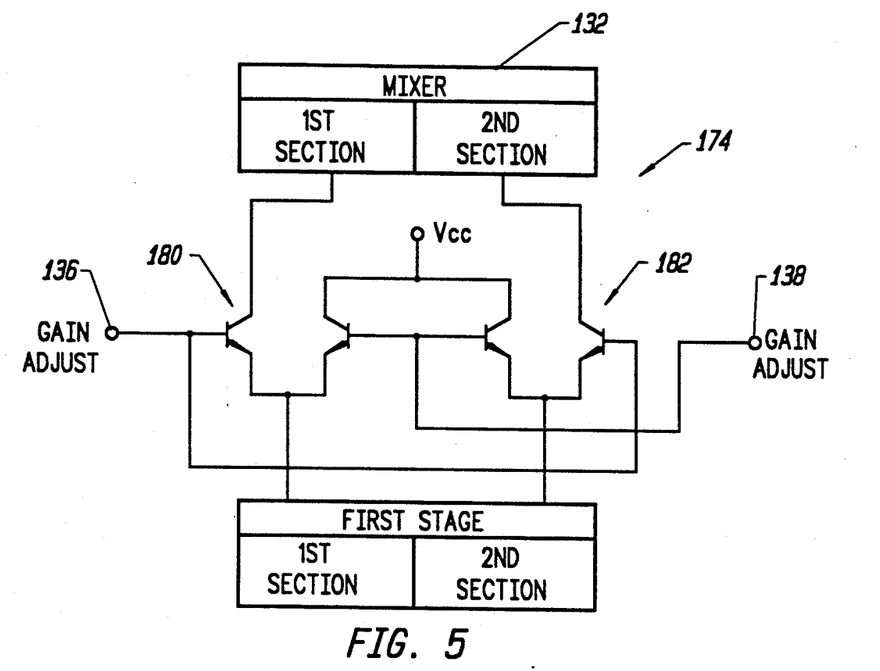
FIG. 5 is a circuit diagram of the second stage of a differential-circuit variable amplifier of FIG. 2.

FIG. 5 is a circuit diagram of the second stage 174 of the amplifier 126. Each section 180,182 of the second stage is a differential amplifier comprised of two transistors in a common base configuration. Signals from each transistor 176,178 of the first stage are received at the emitters of the common base transistors. The gains of the first and the second sections, which form a "super" differential amplifier, are adjusted by bias currents applied at the gain control terminals 136 and 138. The mixer 132 has two sections, which serve as respective loads for one of the transistors in each of the differential amplifiers pairs 180,182.

Figure 6:
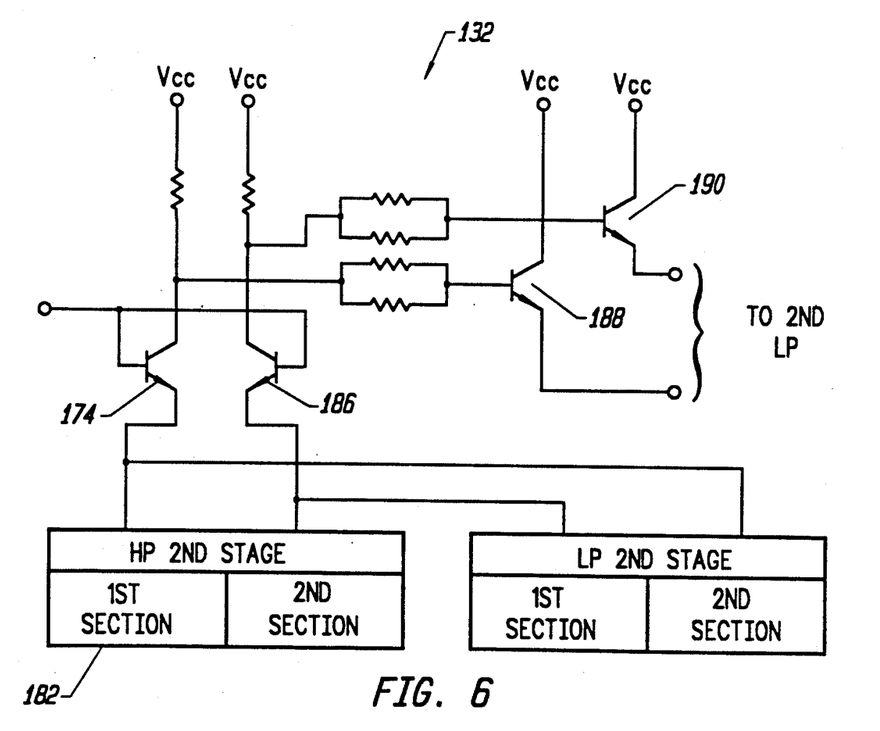
FIG. 6 is a circuit diagram of a summer or mixer stage of the differential-circuit variable amplifier of FIG. 2.

FIG. 6 is a circuit diagram for the mixer 132. The mixer circuit, or summer circuit, comprises a differential amplifier made up of transistors 184 and 186 in a common base configuration. Signals from both of the second stage amplifiers of amplifiers 126,128 are fed to the emitters of the transistors 174,176, as shown. The output signals of the differential amplifier is transmitted to a pair of transistors 188 and 190 which are emitter followers, with the multi-pole low-pass filter 134 as a load.

Figure 7:
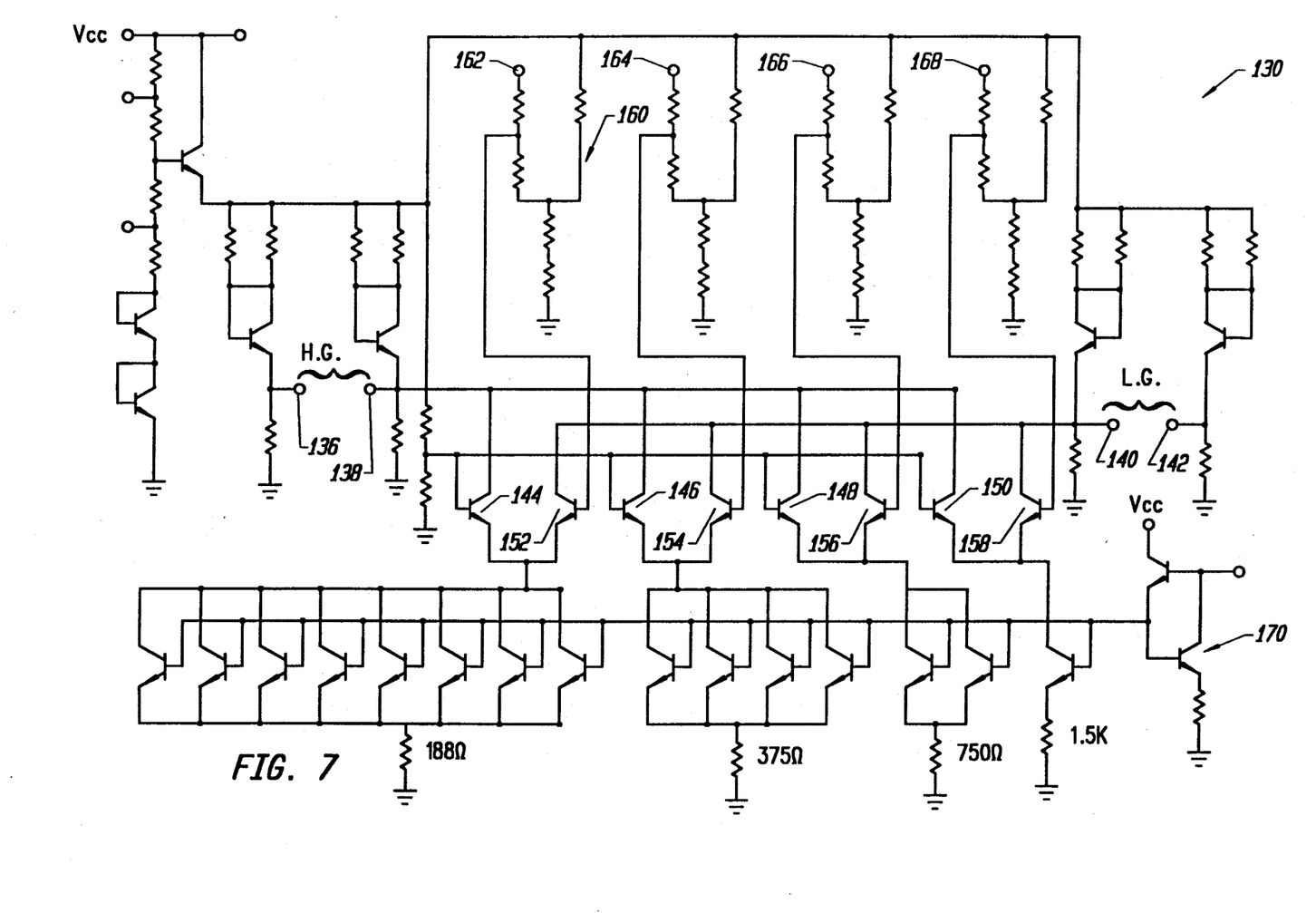
FIG. 7 is a circuit diagram of a digitally-controlled biasing circuit used to set the gains of the high-pass filter channel and of the low-pass filter channel of the slimming circuit according to the invention.

FIG. 7 is a circuit diagram of a digitally settable 126,128. As discussed previously, each of the amplifiers includes a second differential stage 174 that is constructed to have two transistor amplifiers in a common base configuration so that the gain of the second stage can be varied by adjusting the relative bias current at the bases of the two transistors. One transistor in the stage has a fixed bias current at terminal 136 and an adjustable bias current at a terminal 138. The same circuit arrangement is used for the second stage of the amplifier 128, with terminals 140 and 142 being provided as the gain control terminals.

As shown in FIG. 7, the bias current at terminal 138 is set by the currents passing through transistors 144-150. The bias currents at terminal 140 are set by the currents through transistors 152-158. The bases of transistors 144-150 are connected to a fixed-bias resistor network. The bases of transistors 152-158 are connected to variable biasing networks, such as, for example, the network 160 so that each pair of transistors 144 and 152, etc., can be differentially biased by digital signals provided at the pads 162-168, as shown in the figure. The loads for these pairs of transistors 144 and 152, etc., are banks of transistors whose conduction characteristics are determined by a fixed biasing network 70. The use of banks of 1,2,4 and 8 transistors in the emitter circuits of the transistor pairs 144 and 152, etc., provides for binary encoding of 16 levels of slimming adjustment.

Figure 8:
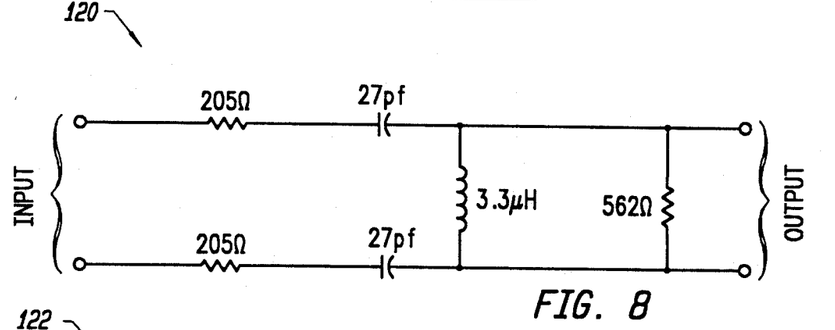
FIG. 8 is a circuit diagram of a balanced high-pass filter.
Figures 9, 10:
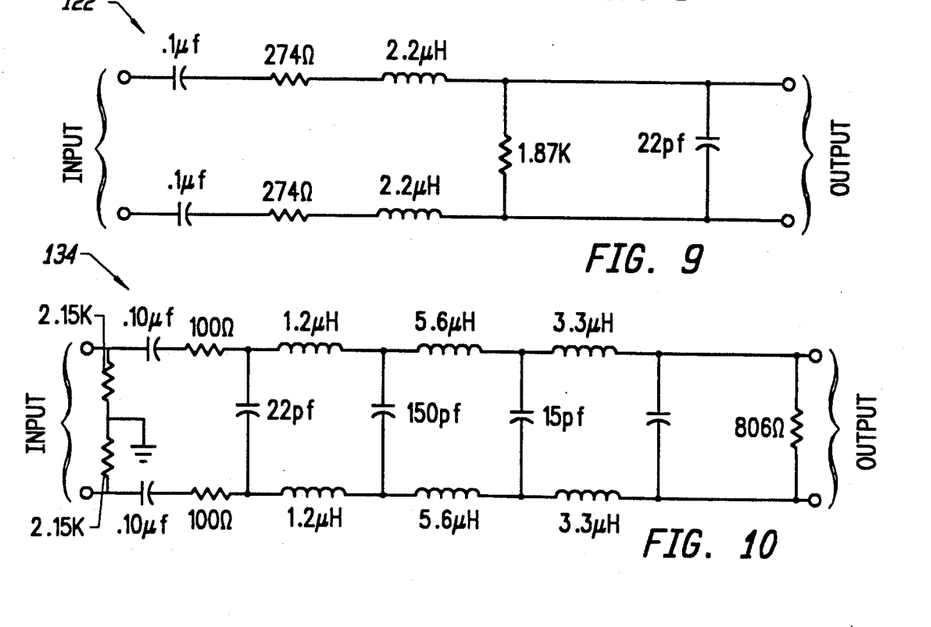
FIG. 9 is a circuit diagram of a balanced low-pass filter.
FIG. 10 is a circuit diagram of a balanced, multipole, low-pass filter.

FIGS. 8, 9 and 10 illustrate respective specific designs for: the low-pass filters 16,122; the high-pass filters 14,120; and the multipole low 27,134. These filter designs are implemented as conventional, passive-element designs to provide an overall linear-phase response characteristic for the pulse-slimming circuit.

Figure 11:
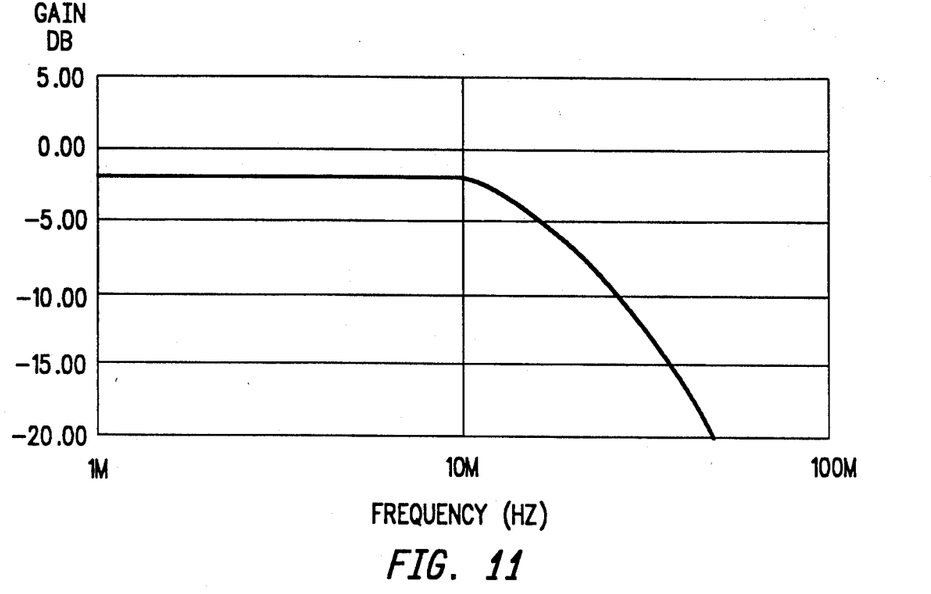
FIG. 11 is a plot of the gain versus frequency characteristic for the low-pass filter of FIG. 8.
Figure 12:
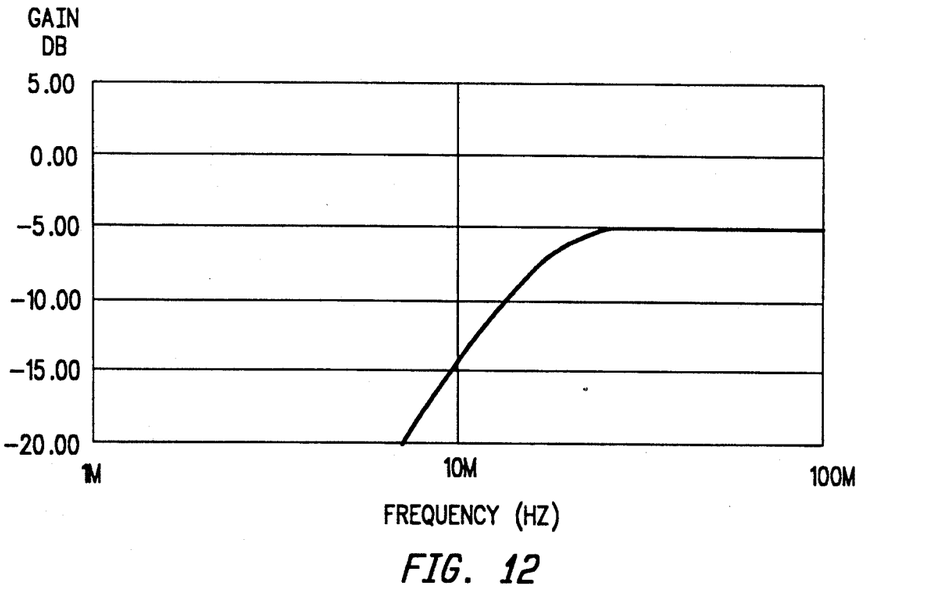
FIG. 12 is a plot of the gain versus frequency characteristic for the high-pass filter of FIG. 9. characteristic for the multi-pole filter of FIG. 10.
Figure 13:
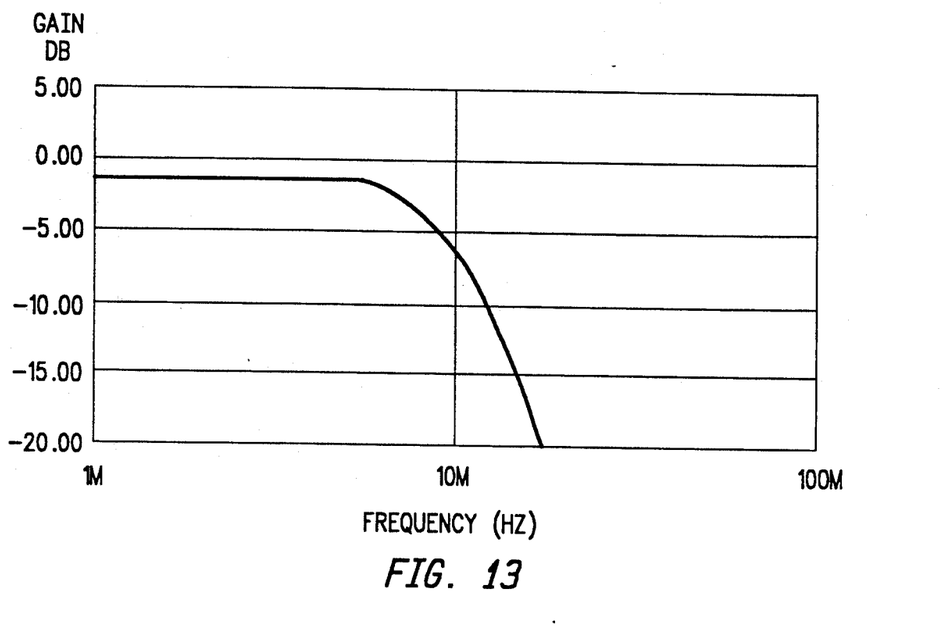
FIG. 13 is a plot of the gain versus frequency characteristic for the multi-pole filter of FIG. 10.

FIGS. 11, 12 and 13 illustrate, respectively, the gain versus frequency response for the filter circuits 8,9,and 10.

Figure 14:
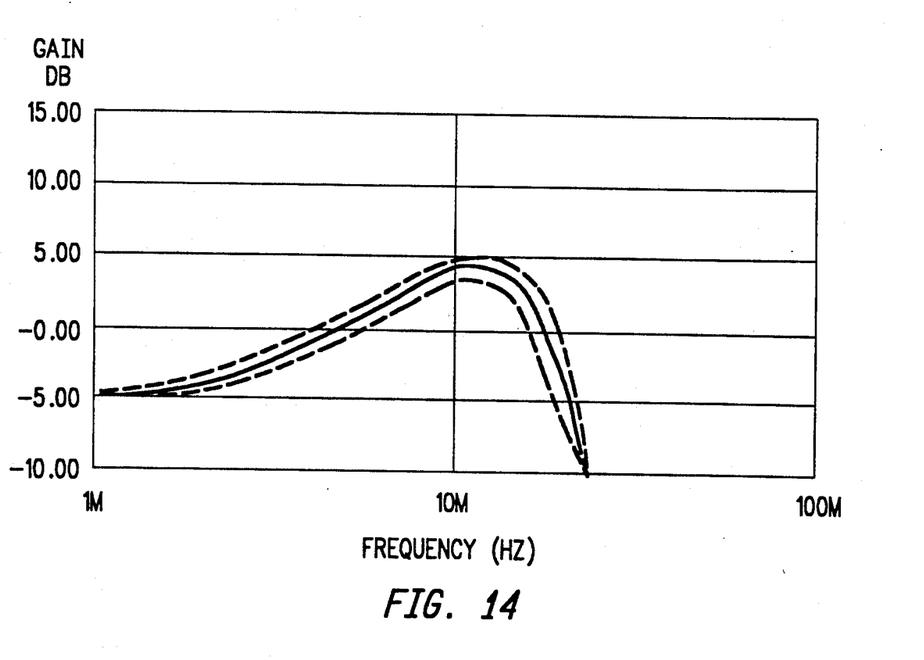
FIG. 14 is a plot of gain versus frequency for the complete slimming circuit of FIG. 2.

FIG. 14 illustrates the overall gain versus frequency response plot for the pulse slimming circuit of FIG. 2 according to the invention. The operation of the circuit has been illustrated by transfer functions for three levels of slimming in FIG. 13. The resultant gain versus frequency response plots are intended to show what is essentially a flat response up to about 1 MHz, an enhanced response above 1 MHz, and rapid decay at about 10 mHz. This general type of response is selected, as described above, by adjusting from the time-domain shape of the pulse delivered from the read/write head and processed through the pulse-slimming circuit. The response characteristic is a compromise between two effects. The width of a pulse peak at half its height is typically 100 nsec. so that the corresponding plot of the pulse in the frequency domain has a half width of the order of a few mHz. The pulse is broadened by enhancement of gain in the vicinity of 10 mHz to yield a slimmer pulse in the time domain. On the other hand, by providing a hard, sharp cutoff at about 10 mHz, high frequency noise in the pulse is suppressed.

Alternative embodiments of slimming circuits are obtained by using different filter responses for the filter functions 120,122 of FIG. 2.

Figure 15:
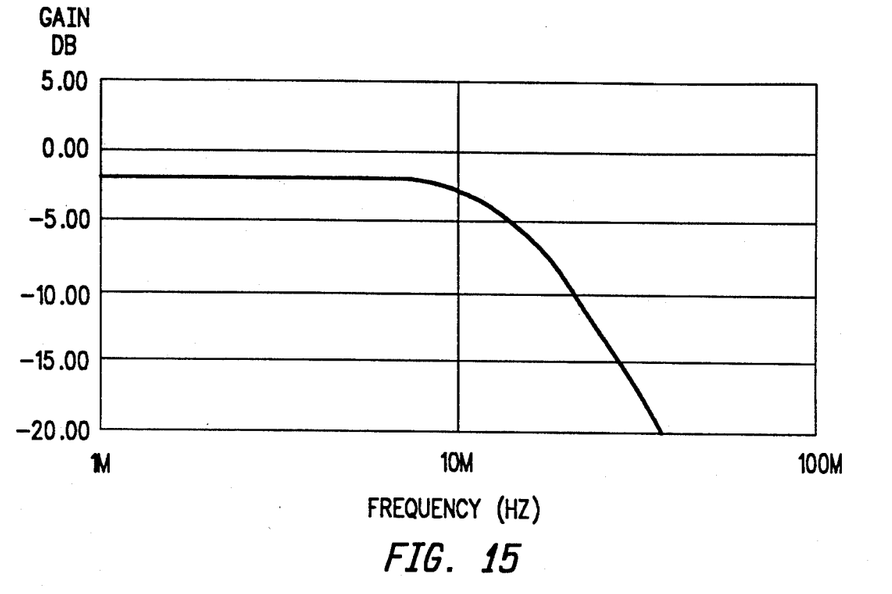
FIG. 15 is plot of the gain versus frequency plot for a low pass filter.

FIG. 15 shows a plot of a lowpass filter having a frequency response similar to the lowpass filter 122 of FIG. 2 and FIG. 8. This filter is combined in a circuit such as shown in FIG. 2 with a notch-filter in place of the high pass filter 120.

Figure 16:
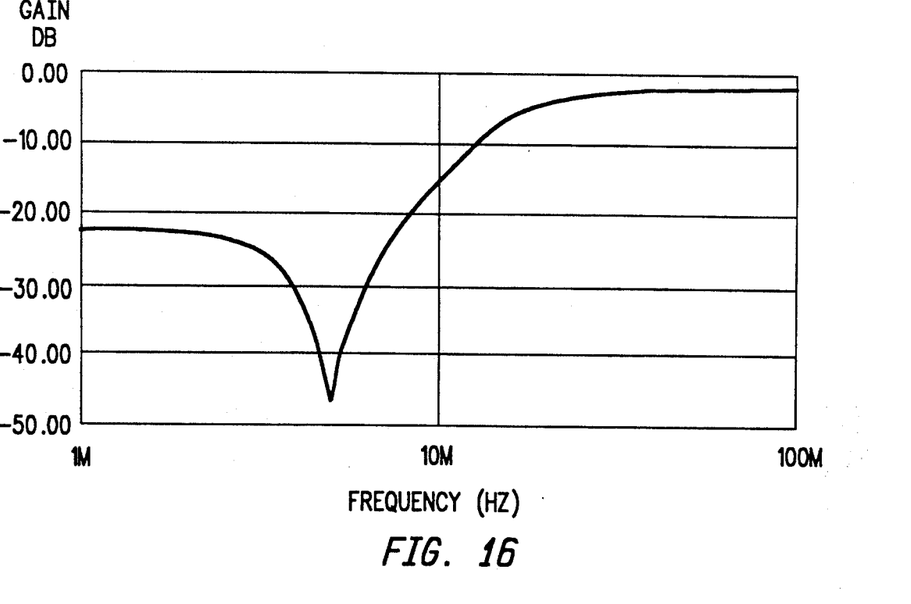
FIG. 16 is a plot of gain versus frequency for a notch filter substitute for the high pass filter of FIG. 2.

FIG. 16 shows the gain versus frequency response of the notch filter. The response obtained from the circuit, which uses the filters described in FIGS. 15 and 16, is similar to the response of FIG. 14. The gains of variable amplifiers 126,128 are set to obtain a desired slimming response.

Looked at another way, the slimming circuit, according the read signal. The slimming, or peaking, is determined by the zeroes of the transfer function. The poles of the transfer function are set to provide a desired phase response and help to determine the low pass cut-off frequency. Subtraction of the signal from the parallel filters provided by the present invention permit pulse slimming for magnetic recording applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for slimming read signals received from a read/write head of a rotating disk data storage device comprising the steps of:

filtering said read signal into low frequency components extending from a first frequency to a second frequency and high frequency components extending from a third frequency to a fourth frequency, so that said low frequency filtered signal and said high frequency filtered signal have common frequencies, and so that said second frequency is higher than said first frequency, said fourth frequency is higher than said third frequency, said second frequency is higher than said third frequency, and said second frequency corresponds to a desired noise cut-off frequency;

amplifying said low frequency components by an amount selected in accordance with a preselected criterion to generate a low frequency amplified signal having a desired characteristic between said first frequency and said third frequency and between said second frequency and said fourth frequency;

amplifying said high frequency components by an amount selected in accordance with a preselected criterion to generate a high frequency amplified signal having an enhanced characteristic between said third frequency and said second frequency; and adding said amplified components to provide a slimmed read signal.

2. The method of claim 1 including the step of further low-pass filtering the slimmed head signal.

3. A circuit for slimming read signals received from a read/write head of a rotating disk data storage device comprising:

first means for filtering said read signal into low frequency components extending from a first frequency to a second frequency;

second means for filtering said read signal into high frequency components extending from a third frequency to a fourth frequency;

wherein said first and second means for filtering pass at least one common frequency of said signal, and wherein said second frequency is higher than said first frequency, said fourth frequency is higher than said third frequency, said second frequency is higher than said third frequency, and said second frequency corresponds to a desired noise cut-off frequency;

first means for variably amplifying by an amount selected in accordance with a preselected criterion for generating a high frequency amplified signal having an enhanced characteristic between said third frequency and said second frequency, connected to the output of said first means for filtering for amplifying the output signal from said first means for filtering;

second means for variably amplifying by an amount selected in accordance with a preselected criterion for generating a low frequency amplified signal having a desired characteristic between said first frequency and said third frequency and between said second frequency and said fourth frequency, connected to the output of said second means for filtering for amplifying the output signal form said second means for filtering; and means for combining, connected to receive output signals from said means for variably amplifying, for algebraically combining the output signals of said means for variably amplifying and for generating slimmed versions of said read signal.

4. The circuit of claim 3 wherein said first and second means for variably amplifying include a digitally programmable circuit which provides control signals for controlling the gain of each of said means for variably amplifying.

* * * * *